US007721449B2

(12) United States Patent
Rasa et al.

(10) Patent No.: US 7,721,449 B2
(45) Date of Patent: May 25, 2010

(54) VEGETABLE PEELER

(76) Inventors: Iwan Roland Rasa, Zollhausstrasse 16, CH-8505, Pfyn (CH); Nousha Rasa, Zollhausstrasse 16, CH-8505, Pfyn (CH)

( * ) Notice: Subject to any disclaimer, the term of this patent is extended or adjusted under 35 U.S.C. 154(b) by 526 days.

(21) Appl. No.: 10/505,253

(22) PCT Filed: Jan. 13, 2003

(86) PCT No.: PCT/CH03/00010

§ 371 (c)(1), (2), (4) Date: Aug. 18, 2004

(87) PCT Pub. No.: WO03/070070

PCT Pub. Date: Aug. 28, 2003

(65) Prior Publication Data

US 2006/0037201 A1 Feb. 23, 2006

(30) Foreign Application Priority Data

Feb. 22, 2002 (CH) ...................................... 314/02
Jun. 5, 2002 (CH) ...................................... 943/02

(51) Int. Cl.
*B26B 3/00* (2006.01)

(52) U.S. Cl. .................................................... 30/279.6

(58) Field of Classification Search ................ 30/113.3, 30/123.5, 123.6, 123.7, 279.4, 279.6, 280, 30/356; D7/693, 695; 99/584, 588, 590
See application file for complete search history.

(56) References Cited

U.S. PATENT DOCUMENTS

| | | | | |
|---|---|---|---|---|
| 44,044 | A * | 8/1864 | Howland | 99/588 |
| 542,606 | A * | 7/1895 | Cromwell | 30/280 |
| 754,191 | A * | 3/1904 | Beil | 30/123.5 |
| 1,071,603 | A * | 8/1913 | Castello | 30/280 |
| 1,156,652 | A * | 10/1915 | Aiken | 30/280 |
| 1,204,179 | A * | 11/1916 | Myers | 30/123.5 |
| 1,228,935 | A * | 6/1917 | Lilpakka | 30/279.4 |
| 1,286,222 | A * | 12/1918 | Bumbaugh | 30/123.5 |
| 1,367,876 | A * | 2/1921 | Heffner | 30/279.6 |
| 1,516,683 | A * | 11/1924 | Phare | 30/113.3 |
| 2,020,043 | A * | 11/1935 | Taylor | 30/526 |
| 2,106,796 | A * | 2/1938 | De Vault | 30/280 |
| D120,390 | S * | 5/1940 | Waller | D7/695 |
| 2,228,572 | A * | 1/1941 | Lofgren | 30/279.6 |
| D143,694 | S * | 1/1946 | Zimmer | D7/695 |
| 2,554,189 | A * | 5/1951 | Hall | 30/280 |

(Continued)

FOREIGN PATENT DOCUMENTS

JP 10155647 * 6/1998

(Continued)

*Primary Examiner*—Jason Daniel Prone
(74) *Attorney, Agent, or Firm*—Moetteli & Associés Sàrl

(57) ABSTRACT

The invention relates to a vegetable peeler having two gripping surfaces connected to each other by a peeling blade as well as a cross-piece. According to the invention, the two lateral gripping surfaces and the interconnecting cross-piece are forming a holder, the dimension of the legs (L) of the U-shaped holder being shorter in peeling direction (A) than the distance (B) between the gripping surfaces. In this way, direct guiding the peeling blade is enabled without any lever arm. The peeling blade, when used, is directly between the fingers and, therefore, can be guided in an extremely precise, handy and safe way.

14 Claims, 2 Drawing Sheets

U.S. PATENT DOCUMENTS 2,829,434 A * 4/1958 Schweikert .................. 30/280
2,986,813 A * 6/1961 De Vault ...................... 30/280
3,571,925 A * 3/1971 Deutschmann ............... D7/693
3,674,503 A * 7/1972 Martinsen .................... D7/693
3,721,573 A * 3/1973 Martinsen .................... 30/314
3,961,418 A * 6/1976 Neveu ......................... 99/590
4,943,295 A * 7/1990 Hartlaub et al. ............... 30/329
5,555,892 A * 9/1996 Tipton ........................ 600/564
5,659,962 A * 8/1997 Tagou ....................... 30/279.6
5,865,110 A * 2/1999 Yonezawa .................. 30/279.6
6,619,194 B1 * 9/2003 Kuan ........................... 99/588
6,834,579 B2 * 12/2004 Kuan ........................... 99/588
D501,123 S * 1/2005 Rasa ........................... D7/695
6,968,778 B2 * 11/2005 Karyo ......................... D7/693
D542,104 S * 5/2007 Holcomb et al. ............. D7/695
7,421,787 B2 * 9/2008 White et al. ............... 30/279.6
D585,710 S * 2/2009 Scimone ...................... D7/695
D592,453 S * 5/2009 Rasa ........................... D7/412
2006/0042097 A1 * 3/2006 Kim .......................... 30/279.6
2009/0235830 A1 * 9/2009 Rasa ........................... 99/588

FOREIGN PATENT DOCUMENTS

WO WO-03/070070 A1 * 8/2003
WO WO 2006131005 A1 * 12/2006

* cited by examiner

VEGETABLE PEELER

This application is the National Stage of International Application No. PCT/CH03/00010, filed Jan. 13, 2003, which claims the benefit under 35 U.S.C. §119(a) of Swiss patent application No. 314/02 filed Feb. 22, 2002 and Swiss patent application No. 943/02, filed Jun. 5, 2002.

BACKGROUND

Vegetable peelers have been known and been around the market for a significant amount of time. The most common types of vegetable peelers are peeling blade e.g., pendulum blade which includes a cutting edge, also called blade, and a guiding plate, also called guiding cross-piece, which extends parallel thereto and delimits the thickness of the portion to be peeled off. Such peeling blades are either held on one side by a shank, like a knife, or are supported at both sides between two lateral surfaces which continue often in a handle, thus forming a grip spaced from the peeling blade.

Vegetable peelers comprising pendulum blades which are held unilaterally by a shank are known, for example, from U.S. Pat. No. 2,252,094; 2,351,327 or 3,956,825. The embodiments described in these documents differ substantially only in the manner of pivotally supporting the pendulum blade.

Vegetable peelers comprising pendulum blades which are supported at both sides are known, for example, by U.S. Pat. No. 2,986,813 or JP-A-10 155 647. In the case of the vegetable peeler known from the latter document, the guiding cross-piece extending parallel to the blade is subdivided, thus making it flexible and cutting a more or less thick peel disk of the vegetable in dependence on the pressure exerted. The solutions according to the above-mentioned documents have the disadvantage that the hand, with which a known peeler is held, has to perform large movements in order to be able to guide the peeling blade in an aimed manner.

With a vegetable peeler having a unilaterally held pendulum blade, the user holds normally the shank which extends laterally off the pendulum blade. The use of such a vegetable peeler is substantially effected by a pivotal movement similar to that of a knife. Vegetable peelers having a peeling blade with two sides in form of a pendulum blade are often used with a drawing motion towards the user or with a motion under pressure off the user, the blade following the drawing motion or the motion under pressure. Depending on the embodiment, the distance between the peeling blade and the grip is more or less large.

SUMMARY

Example embodiments may provide a vegetable peeler of the type mentioned in the outset which may be easier and safer to handle.

In accordance with an example embodiment, the vegetable peeler may include lateral surfaces, which may be directly formed as gripping and bearing surfaces. In this way, as far as possible, a direct guidance of the peeling blade may be enabled so that there is virtually no longer any lever arm between the hand of the user and the peeling blade. This direct and immediate guidance of the peeling blade may enable a better adaptation of the movement of the peeling blade to the contour of the vegetable to be peeled. In the sense of a double effect, the lateral surfaces may serve to receive and fasten the peeling blade, on the one hand, and as a gripping surface for holding and handling the vegetable peeler. As a result, the width of the vegetable peeler may be larger in relation to the length.

According to another example embodiment, the gripping surfaces may be formed in such a way that the clamped vegetable peeler may be between the thumb and at least one finger of one hand and, in use, the fingers engage the bearing bolts of the peeling blade. In this way, the peeling blade can be immediately at the palm, which may be guided in a simply and precise manner. In a likewise simple way, the hand of the user can exert the necessary pressure for holding and actuating the vegetable peeler.

In such a manner, each gripping surface may form a bearing surface for the peeling blade, wherein the gripping surfaces being preferably interconnected by means of a cross-piece which extends transversely to the peeling direction, and the surface may be for design or advertising. A cross-piece can improve the rigidity of the vegetable peeler, particularly the distorsion stiffness of it, so that the peeling blade itself may be formed less stable than in an embodiment of the vegetable peeler without a cross-piece. If each gripping surface is formed as a bearing surface, a mobility of the peeling blade may be enabled and, thus, a better adaptation of the peeling blade to the contour of the vegetable to be peeled. Using the cross-piece as a design or advertising surface may constitute a double effect of the cross-piece and may, therefore, also contribute to a progressive and attractive exterior of the vegetable peeler.

According to another example embodiment, the cross-piece may be parallel to the peeling blade vaulted convex in upward direction away from the peeling blade or concave in downward direction towards the peeling blade and interconnects the gripping surfaces preferably almost at the center.

According to another example embodiment, the peeling blade is formed as a pendulum blade rotatably held at the lateral surfaces. Thus, the pendulum blade may be rotatably supported so that it may be able to adapt itself in a particularly easy and quick manner to the outer contour of the vegetable to be peeled. In this way, it may be less frequently necessary, to adapt the vegetable peeler to the contour of the vegetable to be peeled; wherein the peeling blade formed as a pendulum blade adjusts rather itself automatically to the contour of the vegetable to be peeled.

In such a manner, the lateral surfaces and the cross-piece may be integrally or multisectionally formed, preferably in a plane or ribbon form of sheet metal or plastic material. In this way, production of the vegetable peeler may be simplified. Such a vegetable peeler can also be produced in a very cost saving manner.

According to another example embodiment, a gripping depression may be formed into each lateral surface. The gripping depression may be preferably situated at the side of the respective lateral surface opposite the peeling blade. Such lateral surfaces, which may be provided with gripping depressions may be particularly easily seized by the inner fingertips so that the fingers can support themselves in a stable way on the lateral surfaces. Even hard vegetables can be peeled efficiently with such a peeler, because such a vegetable peeler is well in the hand, and slipping of the fingers of the user from the vegetable peeler may be reduced and/or prevented to a high extent.

In such a manner, at least one of the lateral surfaces comprises an abutment for the peeling blade. In this way, the excursion of the peeling blade may be limited so that safety during peeling, particularly in the case of very vaulted surfaces of individual sorts of vegetables, can be improved.

In accordance to another example embodiment, the vegetable peeler may include a peeler blade arranged in the peeling plane or parallel to it and inclined to the peeling direction. In this way, just at the beginning and at the end of a peeling procedure, the contact area between the peeling blade and the vegetable to be peeled may be reduced so that less force has to be exerted for peeling the vegetable. Moreover, the peeling procedure can be effected in a simpler way by a peeling blade that is inclined to the peeling direction, because the vegetable to be peeled is peeled in a saw-like manner, whereas in the case of a peeling blade arranged transversely to the peeling direction, the vegetable is rather split by the peeling blade. The peeling procedure effected in a saw-like manner, however, requires much less force than with splitting the vegetable as described before.

According another example embodiment, an angle is formed between the longitudinal axis of the peeling blade and an axis lying in the peeling plane transversely to the peeling direction, preferably between 3 and 25°, particularly between 10 and 15°. Such an angle has proved worthwhile in the practice of handling the vegetable peeler and constitutes a compromise between a relative large angle, which may offer some advantages in peeling in a saw-like manner, and a small angle by which the thickness of the vegetable skin taken off is increased.

According to yet another example embodiment, the peeling blade is inclined to the peeling plane in such a manner that the leading edge and the trailing edge of the peeling blade are in different planes. In this case, the peeling blade works about in form of a planning tool by which advantages can be achieved in practical handling of the vegetable peeler in dependence on the consistency of the vegetable to be peeled.

BRIEF DESCRIPTION OF THE DRAWINGS

Example embodiments are subsequently described in detail with reference to the drawings, all characteristics described or illustrated forming the subject matter of the present invention either per se or in any combination, independent from their combination in the claims or their reference claims. What is shown is in:

DETAILED DESCRIPTION OF EXAMPLE EMBODIMENTS

Figure 1:
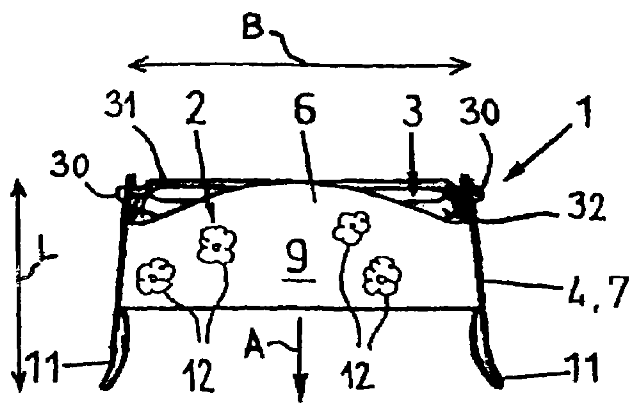
FIG. 1 a schematic plan view of an example embodiment of a vegetable peeler.

In FIG. 1, a plan view of a vegetable peeler 1 according to an example embodiment is schematically illustrated. The vegetable peeler 1 comprises two elements, i.e. a substantially U-shaped holder 2 which extends transversely to the peeling direction A and a peeling blade 3 pivotally held therein.

Figure 5:
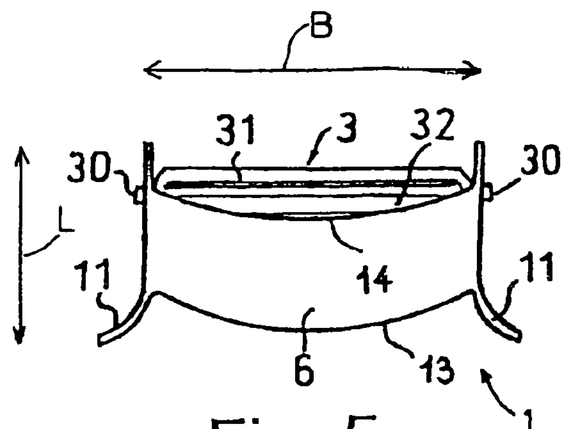
FIGS. 5 to 10 plan views of different example embodiments of the vegetable peeler having a differently shaped cross-piece.

The peeling blade 3 is normally an integral element manufactured of metal or plastic material which includes two parallel interconnected cross-pieces, the front cross-piece forming the cutting edge 31 of the peeling blade, while the rear cross-piece represents the so-called guiding cross-piece 32 of the peeling blade (see FIGS. 1 and 5). The guiding cross-piece 32, upon peeling, engages the vegetable to be peeled (not shown), thus determining the thickness of the skin to be cut off. Laterally, in the interconnection region of cutting edge 31 and guiding cross-piece 32, at each one of the two sides a bearing bolt 30 is formed, the bearing bolts forming the bearing axle of the peeling blade and representing, in a geometrical sense, the pivot axis.

Figure 10:
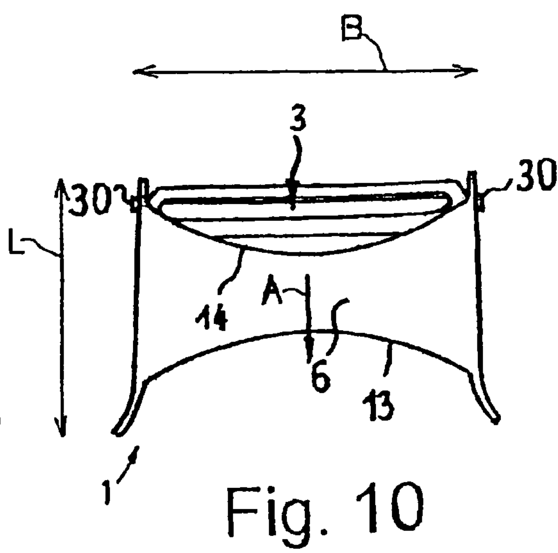

As is indicated mainly in FIGS. 1, 5 and 10, the peeling blade 3, according to preferred embodiments, is formed as a so-called pendulum blade.

According to another variant, not shown, a cutter of one of known shapes may be provided in the lateral surfaces.

Figure 2:
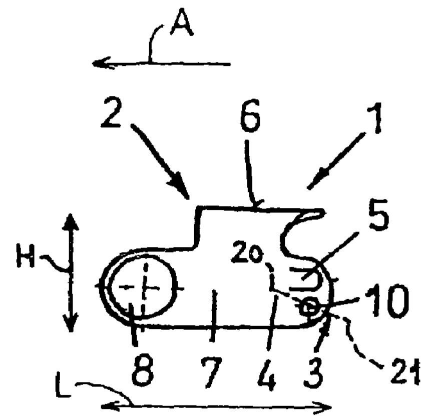
FIG. 2 a schematic side elevation of the vegetable peeler shown in FIG. 1, but without the peeling blade.
Figure 3:
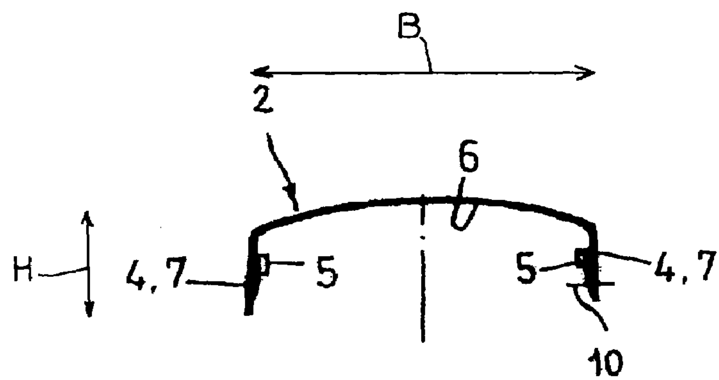
FIG. 3 a front view of the vegetable peeler without the peeling blade.

The holder 2 of the vegetable peeler 1 has two lateral surfaces 4 interconnected by the peeling blade 3. According to the embodiments illustrated in FIGS. 1 to 10, each lateral surface 4 forms a bearing surface for the peeling blade 3. The lateral surfaces 4 are interconnected preferably almost at the center by a cross-piece 6 extending about transversely to the peeling direction (see arrow A in FIGS. 1 and 10) (vide FIG. 2). In FIGS. 1 to 3, it can be seen that the cross-piece 6, when using the vegetable peeler 1 extends above the peeling blade 3 and transversely to the peeling direction of the vegetable to be peeled.

The holder 2 of the vegetable peeler 1 has two lateral surfaces 4 interconnected by the peeling blade 3. According to the embodiments illustrated in FIGS. 1 to 10 and 12, each lateral surface 4 forms a bearing surface for the peeling blade 3. The lateral surfaces 4 are interconnected preferably almost at the center by a cross-piece 6 extending about transversely to the peeling direction (see arrow A in FIGS. 1 and 10) (vide FIG. 2). In FIGS. 1 to 3, it can be seen that the cross-piece 6, when using the vegetable peeler 1 extends above the peeling blade 3 and transversely to the peeling direction of the vegetable to be peeled.

As may be seen in FIGS. 1 and 2, the width B of the vegetable peeler 1 is larger in relation to the length L. It may also be seen that the height H is shorter than the width B of the vegetable peeler.

As is represented in FIG. 3, the two leg heights of the substantially U-shaped holder 2 are shorter than the width of its U-shape, and the width of the U-shape, in substance, extends, in use, above the peeling blade. As may be seen from FIG. 3, a narrow contour or silhouette is visible in a front view. The entire area, as seen, is only a small fraction of the total area of the vegetable peeler.

Figure 4:
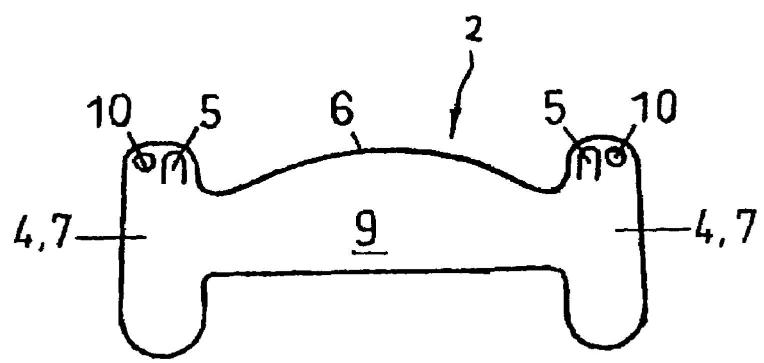
FIG. 4 a developed projection of the vegetable peeler according to FIG. 1 without the peeling blade.

In the lateral surfaces, which are formed as bearing surfaces, axle bearings 10 are provided in which the bearing bolts 30 of the peeling blade 3 are pivotally supported. In vegetable peelers known in the prior art, the lateral surfaces 4 spaced from the grip are directly or indirectly connected to it. In the case of the vegetable peeler according to the invention, however, the lateral surfaces 4 are formed as gripping surfaces 7. The lateral surfaces 4 correspond substantially to one another and are, as shown in FIG. 4, constructed and arranged in a mirror-inverted fashion. Thus, the whole lateral surfaces 4 constitute both bearing surfaces for the peeling blade and gripping surfaces 7. A special construction of the gripping surfaces 7 is not forcibly required, but can further simplify handling of the vegetable peeler. The gripping surfaces 7 are designed in such a manner that they can be clamped between the thumb and at least one finger of one hand of the user, while gripping the bearing bolts 30 of the peeling blade 3 i.e. they can be held firmly between thumb and fingers for actuating the peeling blade.

As is indicated in FIG. 2, a gripping depression 8 is formed into each lateral surface 4. However, it is also possible, in accordance with an embodiment not shown, to provide gripping knubs instead of gripping depressions. While the gripping depressions 8 are formed as concave depressions, when seen from the holding side, knubs will be designed rather projecting to the exterior with respect to the gripping side, i.e. in a convex shape. However, both variants will be provided to hold the vegetable peeler 1 safely even with wet hands, for example.

Each gripping depression 8 is situated on that side of the respective lateral surface 4 which is opposite the peeling blade 3, as is schematically illustrated in FIG. 2.

In order to limit the pivotal or pendulum movement of the peeling blade 3 formed as a pendulum blade, abutments 5 extending to the interior are provided on the lateral surfaces 4 designed as bearing surfaces. At least one of these lateral surfaces comprises such an abutment 5. Preferably, however, the lateral surfaces are symmetrically shaped so that an abutment each is formed on the two lateral surfaces 4. This can be done without any remarkable additional costs. According to FIGS. 2 to 4, the abutment 5 is formed as a tongue laterally stamped in the side walls of the lateral surfaces. In an embodiment of the vegetable peeler that is manufactured of plastic material, it is also possible to form the abutment as a dog extending to the interior. As has been mentioned, the abutment serves the purpose of limiting the pivotal movement and, thus the pivoting angle of the peeling blade.

As has been mentioned and is schematically shown in FIGS. 1 to 10, the gripping surfaces 7 are connected to one another preferably almost at the center by the cross-piece 6. This bridging cross-piece 6 may be flat and, thus, may extend parallel to the peeling blade, or, as indicated in FIGS. 2 and 3, may be vaulted upwards in a convex fashion away from the peeling blade 3. However, it is also possible to vault the cross-piece downwards in a concave shape relative to the peeling blade 3.

Particularly in an embodiment produced from plastic material, it is also possible to provide reinforcement ribs on the lower surface of the cross-piece 6 which are not shown in detail in the illustrated embodiments.

The cross-piece 6 is preferable formed as a design or advertising surface 9 which, in FIG. 1 by way of example, is merely shown in the form of a flower pattern 12. In so far, the cross-piece can be used particularly advantageously in the sense of a double effect as an advertising surface. Depending of the type of the design elements to be provided on the advertising surface 9, it may be of advantage if the cross-piece is flat, i.e. not curved.

The embodiments illustrated in FIGS. 1 to 10 make it clear that the peeling blade 3, as has been mentioned above, is constructed as a pendulum blade rotatably held in the lateral surfaces 4 which are designed as bearing surfaces.

With respect to the shape of the cross-piece 6, a variety of embodiments can be imagined. Apart from the embodiment shown in FIGS. 1 to 4, further shapes of the cross-piece 6 are indicated in FIGS. 5 to 10.

Figure 6:
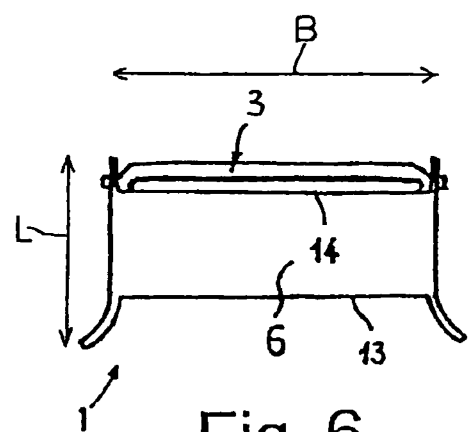
Figure 7:
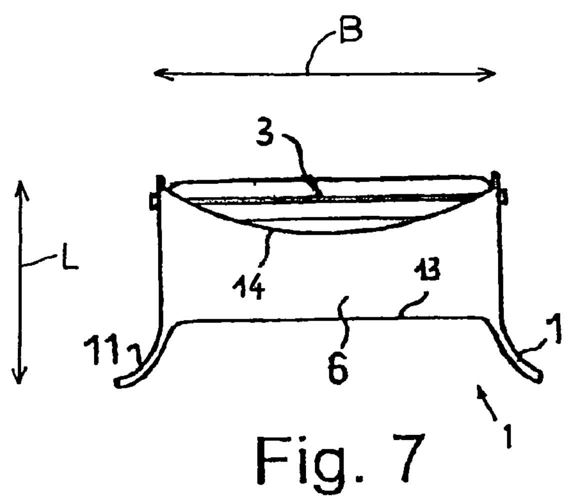
Figure 8:
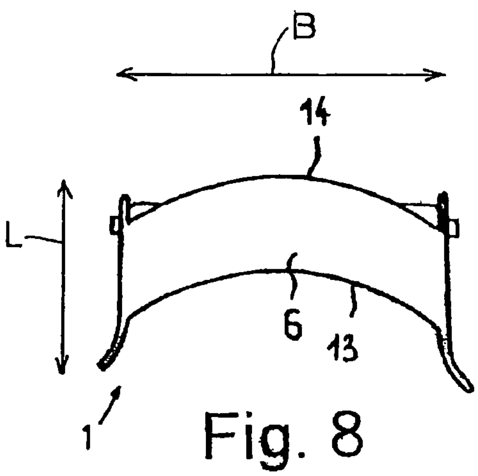
Figure 9:
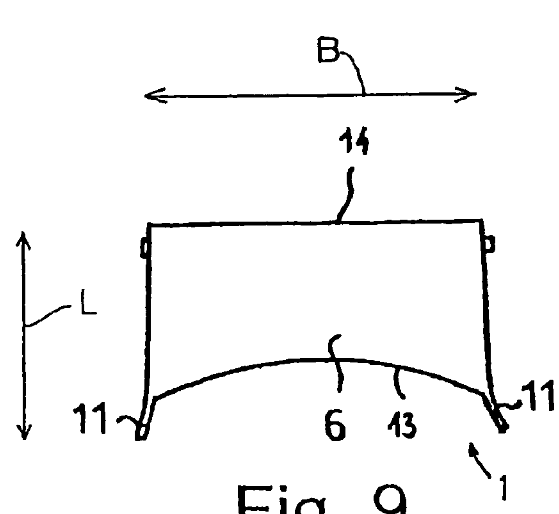

According to FIG. 5, the front edge 13 of the cross-piece 6 is convex, whereas the rear edge 14 is concave. In the embodiment of FIG. 6, front edge 13 as well rear edge 14 extend as a straight line, i.e. transversely to the peeling direction. In accordance with FIG. 7, the front edge 13 is a straight line, but the rear edge is vaulted in a concave shape. According to FIG. 8, the front edge 13 is concave, while the rear edge 14 is convex; according to FIG. 9, the front edge 13 is concave, but the rear edge 14 is a straight line. Furthermore, the front edge 13 as well as the rear edge 14, according to FIG. 10, are concave so that the entire vegetable peeler, in a certain sense, has a waisted appearance.

As may be seen from FIGS. 5 to 10, it is not necessary that the cross-piece 6 covers the peeling blade 3. To the contrary, it may be desirable for the user if the peeling blade can be observed during peeling. This is particularly the case with the embodiments of FIGS. 5, 6, 7 and 10. However, it is neither a necessity for the safety nor for the function of the vegetable peeler to be able to observe the peeling blade during the peeling procedure.

While in the embodiment shown in FIG. 1 the lateral surfaces 4 and gripping surfaces 7 are tapering under an acute angle, the lateral surfaces or gripping surfaces of the embodiments of FIGS. 5 to 10 extend parallel to each other. The embodiments according to FIGS. 5 to 10 seem to be anatomically more favorable. Correspondingly, the lateral surfaces 4 or the gripping surfaces 7 are shown as having curved to the exterior with their ends 11 pointing away from the peeling blade 3 in order to prevent escaping of the vegetable peeler from the hand.

In all embodiments, the lateral surfaces 4 or the gripping surfaces 7 are designed in such a manner that they can be gripped by the thumb and at least one finger of one hand. The index finger may engage the cross-piece 6. This handling enables a very precise and direct guidance of the entire vegetable peeler, and particularly of the peeling blade thereof, exerting pressure being possible without any problem and being manageable in a variable way. This is not possible with traditional vegetable peelers where the real grip is relative remote from the peeling blade.

According to a further embodiment of the invention, the peeling blade 3 is arranged inclined to the peeling plane in such a manner that, as is indicated in dotted lines in FIG. 2, the front edge 20 and the rear edge 21 of the peeling blade 3 are in different horizontal planes. In this embodiment, however, the peeling blade 3 is rigidly connected to the lateral surfaces 4 so that the peeling procedure, in dependence on the position of the peeling blade 3 relative to the vegetable not shown in detail, may be effected in the manner of a planing tool.

Thus, a vegetable peeler has been provided which, due to the direct grasping possibility, can be guided in a more direct, and thus more precise, fashion, therefore being easier to handle.

The invention claimed is:

1. A vegetable peeler for peeling in a peeling direction comprising: two lateral gripping surfaces, interconnected by a peeling blade and by a cross-piece, wherein said peeling blade has a cutting edge and a guiding piece that regulates a thickness of a removed peel, the two lateral gripping surfaces together with the interconnecting cross-piece form a substantially U-shaped holder, the vegetable peeler being substantially shorter in the peeling direction than a distance between the lateral gripping surfaces at the peeling blade, and wherein the distance between the lateral gripping surfaces at the peeling blade is substantially larger than a height of the vegetable peeler, the height of the vegetable peeler being perpendicular to a longitudinal length of the lateral gripping surfaces and to the distance between the lateral gripping surfaces at the peeling blade and the crosspiece extends relative to the peeling direction above the peeling blade when used, wherein the longitudinal length is parallel to the peeling direction, the two lateral gripping surfaces each define a middle portion where the crosspiece connects each of the lateral sides, wherein the two lateral gripping surfaces have distal and proximal ends and the blade is connected to the distal ends.

2. The vegetable peeler according to claim 1, wherein the lateral gripping surfaces are constructed in such a manner that they may be clamped between the thumb and at least one finger of a hand.

3. The vegetable peeler according to claim 1, wherein each lateral gripping surface includes a bearing for the peeling blade.

4. The vegetable peeler according to claim 1, wherein the cross-piece extends transversely to peeling direction and is formed as a design or advertising surface.

5. The vegetable peeler according to claim 1, wherein the cross-piece is vaulted convex in upward direction away from the peeling blade or concave in downward direction towards the peeling blade.

6. The vegetable peeler according to claim 1, wherein the peeling blade is formed as a pendulum blade rotatably held at the lateral gripping surfaces.

7. The vegetable peeler according to claim 1, wherein a gripping depression is formed into each lateral gripping surface.

8. The vegetable peeler according to claim 1, wherein at least one of the lateral gripping surfaces comprises an abutment for the peeling blade.

9. The vegetable peeler according to claim 1, wherein the peeling blade is straight.

10. The vegetable peeler according to claim 1, wherein the crosspiece extends parallel to the peeling blade.

11. The vegetable peeler according to claim 1, wherein the lateral gripping surfaces and the cross-piece are integrally or multisectionally formed.

12. The vegetable peeler according to claim 11, where the lateral gripping surfaces and the cross-piece are made from at least one old sheet metal and plastic-material.

13. The vegetable peeler according to claim 1, wherein the cross-piece is flat.

14. The vegetable peeler according to claim 13, wherein the peeling blade and the cross-piece are arranged such that the peeling blade is observable from above.

* * * * *

UNITED STATES PATENT AND TRADEMARK OFFICE

CERTIFICATE OF CORRECTION

PATENT NO. : 7,721,449 B2
APPLICATION NO. : 10/505253
DATED : May 25, 2010
INVENTOR(S) : Iwan Roland Rasa et al.

It is certified that error appears in the above-identified patent and that said Letters Patent is hereby corrected as shown below:

In Col. 8, line 10, replace the phrase "least one old sheet metal and plastic-material" with --least one of a sheet metal and plastic-material--.

Signed and Sealed this

Thirty-first Day of August, 2010

David J. Kappos
*Director of the United States Patent and Trademark Office*